United States Patent [19]

Roberts

[11] 4,437,417
[45] Mar. 20, 1984

[54] ENVIRONMENTALLY SAFE PROCESS FOR DISPOSING OF TOXIC INORGANIC CN-CONTAINING SLUDGE

[75] Inventor: Roy D. Roberts, Chino, Calif.
[73] Assignee: Texaco Inc., White Plains, N.Y.
[21] Appl. No.: 441,470
[22] Filed: Nov. 15, 1982
[51] Int. Cl.³ .................................................. F23G 7/04
[52] U.S. Cl. ..................................... 110/346; 48/206; 110/238
[58] Field of Search ....................... 110/235, 238, 346; 210/631; 48/206

[56] References Cited

U.S. PATENT DOCUMENTS 3,926,129  12/1975  Wall .............................. 110/238 X
4,085,688   4/1978  Smith et al. ....................... 110/238
4,380,960   4/1983  Dickinson ....................... 110/238 X Primary Examiner—Edward G. Favors
Attorney, Agent, or Firm—Robert A. Kulason; Robert Knox, Jr.; Albert Brent

[57] ABSTRACT

Toxic inorganic CN-containing sludge as produced by treating at least a portion of the water used to quench cool and/or scrub the hot raw effluent gas stream from a partial oxidation gasifier with a ferrous salt and a base may be disposed of by separating the inorganic CN-containing sludge from the water and introducing the sludge into the partial oxidation gas generator in admixture with the hydrocarbonaceous fuel feed. Most of the cyanides are effectively destroyed in the reaction zone, and the ash components in the waste solids are recovered as slag from the generator. The separated water is upgraded by further treatment and recycled to the quench tank and/or gas scrubber. The subject process provides an environmentally safe solution for the otherwise costly problem of disposing of toxic sludge. When coal is included in the feed to the gas generator, any calcium in the sludge will act as a fluxing agent for the coal ash. A more fluid slag having a lower ash-fusion temperature is obtained. Because the partial oxidation gasifier may be run at a lower temperature while still producing molten slag, oxygen requirements may be reduced.

16 Claims, 1 Drawing Figure

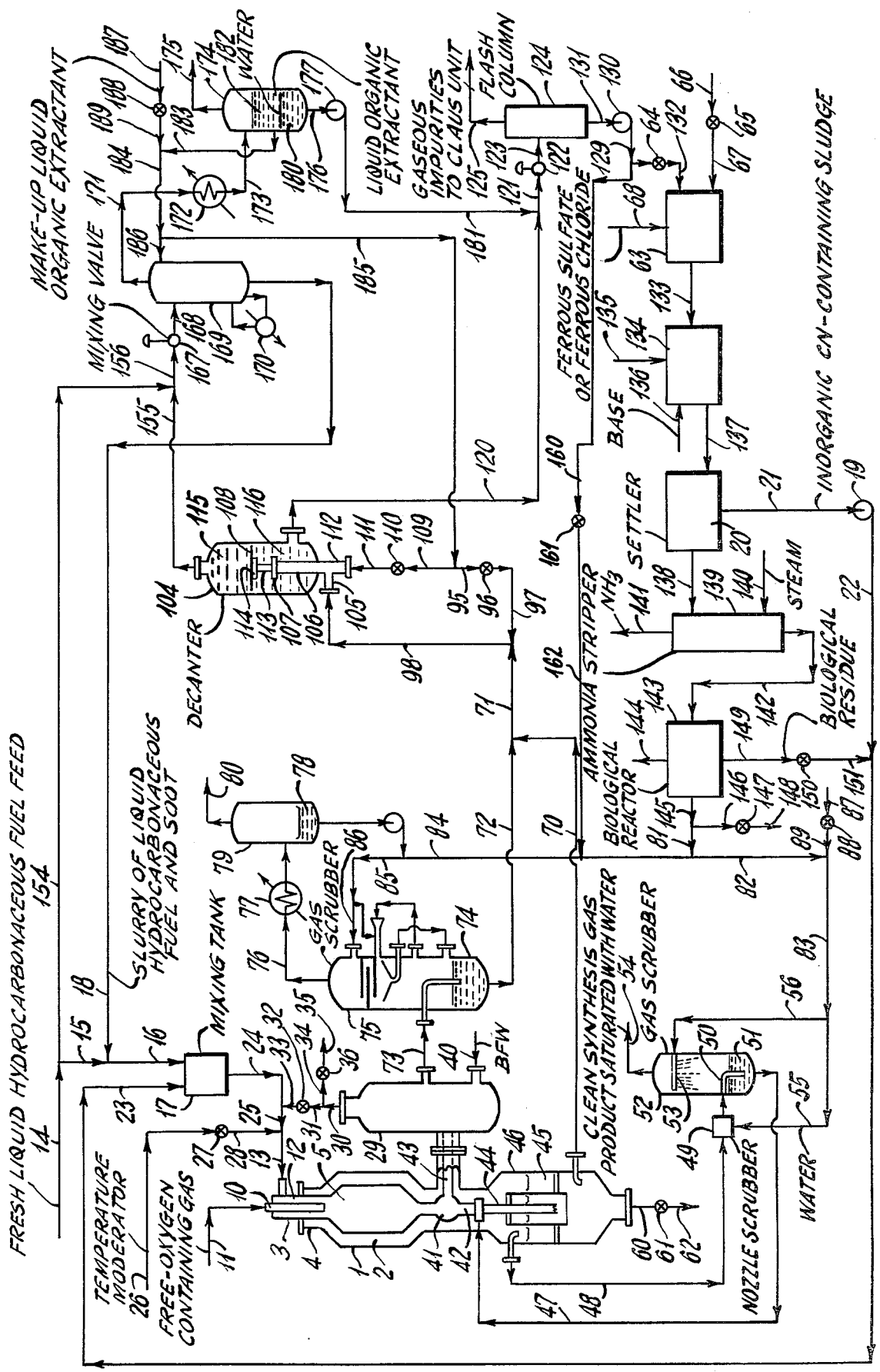

ENVIRONMENTALLY SAFE PROCESS FOR DISPOSING OF TOXIC INORGANIC CN-CONTAINING SLUDGE

BACKGROUND OF THE INVENTION

This invention relates to the partial oxidation of liquid hydrocarbonaceous fuels, including oxygen-containing hydrocarbonaceous fuels and slurries of solid carbonaceous fuels. More specifically, it relates to a pollution abatement process for the environmentally safe disposal of toxic CN-containing sludge produced during the treatment of water used to quench cool and/or scrub the hot effluent gas stream from a synthesis gas generator.

The hot effluent synthesis gas stream i.e., mixtures of $H_2+CO$ from a free-flow non-catalytic partial oxidation gas generator may include trace amounts of HCN, i.e. 0.5 to 100 parts per million (PPM) by weight as well as entrained particulate matter such as soot, ash, slag, and bits of refractory. Water is most commonly used to quench cool and/or scrub the hot effluent gas stream from the reaction zone in order to remove the entrained matter. A portion of the HCN in the synthesis gas stream will be absorbed by the water in the quench and/or cooling zones, along with trace amounts of other water soluble impurities in the gas stream such as formates and halides.

Since large quantities of water are employed in the process for producing synthesis gas, reducing gas, or fuel gas by the partial oxidation of liquid hydrocarbonaceous fuels, including oxygen-containing hydrocarbonaceous fuels and slurries of solid carbonaceous fuels, it is important especially in arid locations to reclaim the quench and/or scrubbing water and to recycle them back to the gas quenching and/or scrubbing zones for reuse. In fact, for economic and environmental reasons, water recovery and upgrading, and recycling the upgraded water to the process have now become necessary.

U.S. Pat. No. 4,211,646, which is incorporated herein by reference, pertains to a method for the treatment of waste waters having toxic and corrosive properties due to the presence of cyanides, formates and halides. A toxic inorganic sludge and an upgraded waste water stream are produced by this method. No procedure is provided in U.S. Pat. No. 4,211,646 for safely disposing of concentrated toxic inorganic sludges.

Sludge disposal would represent a major operating cost in a plant producing synthesis gas from petroleum and coal feed. Free and complexed cyanides in the sludge must be destroyed before any sludge disposal system is environmentally acceptable. Complex cyanides are resistant to chemical destruction. Sunlight may break down complexed cyanide, but free cyanides are then released. If the inorganic sludge is landfarmed, contamination of ground water is a potential hazard.

These problems and others are eliminated by the subject process by which substantially all of the free and complexed cyanides in the inorganic sludge are destroyed in the reaction zone of the partial oxidation gas generator.

SUMMARY OF THE INVENTION

In this pollution abatement process, the hot raw effluent synthesis gas stream comprising $H_2$ and CO from the partial oxidation of liquid hydrocarbonaceous fuels, including oxygenated hydrocarbonaceous organic materials and slurries of solid carbonaceous fuels and containing toxic gaseous impurities such as $H_2S$ and COS as well as trace amounts of HCN and HCL is quench cooled and/or scrubbed with water. A small amount of these toxic materials remain in the water after the rest of the synthesis gas is separated. Formic acid and $NH_3$ may also be present in the quench and/or srubbing water. A toxic inorganic CN-containing sludge is produced by mixing at least a portion of the quench and/or scrubbing water at a temperature in the range of about 60° to 210° F. and a pH in the range of about 7 to 9 with ferrous sulfate or ferrous chloride, and adding sodium or calcium hydroxide to said treated water thereby adjusting the pH to a value in the range of about 9–11 and precipitating said inorganic CN-containing sludge. To prevent the formation of calcium sulfate, the preferred combinations of ferrous salt and base are (a) ferrous sulfate and sodium hydroxide, and (b) ferrous chloride and calcium hydroxide. The toxic inorganic CN-containing sludge is separated from the water and then safely disposed of without creating environmental problems by mixing it with the liquid hydrocarbonaceous fuel feedstream and reacting the mixture in the gas generator by partial oxidation at a temperature in the range of about 1700° F. to 3000° F. and a pressure in the range of about 1 to 250 atmospheres, such as about 10 to 200 atmospheres. The water which is separated from the sludge is upgraded by steam stripping the ammonia, adjusting the pH to a value in the range of about 6–8, and removing organic matter such as formates in a conventional biological reactor. A biological residue is formed which may be recycled to the gas generator as a portion of the feed. The upgraded water may be recycled to the quench cooling and/or scrubbing zone. Alternatively, the upgraded water, biological residue, or both may be discharged from the system, without polluting the environment.

BRIEF DESCRIPTION OF THE DRAWING

The invention will be further understood by reference to the accompanying drawing showing a schematic representation of a preferred embodiment of the process.

DESCRIPTION OF THE INVENTION

The present invention pertains to an environmentally safe continuous method for disposing of toxic material produced in the partial oxidation process for the production of a stream of synthesis gas, fuel gas, or reducing gas from liquid hydrocarbonaceous fuels, including oxygen-containing hydrocarbonaceous fuels and slurries of solid carbonaceous fuels in a liquid carrier. Also included in the feedstock to the gas generator is the toxic inorganic cyanide-containing sludge derived downstream in the process. The product gas may be used with or without further processing and/or purification by conventional methods, depending on the composition of the liquid hydrocarbonaceous fuel feed. Further, water which becomes contaminated with toxic materials during quench cooling and/or scrubbing the hot raw gas stream may be upgraded for reuse or for safe disposal without polluting the environment.

In the process, a hot effluent gas stream is made by the partial oxidation of liquid hydrocarbonaceous fuels, including oxygen-containing hydrocarbonaceous fuels and slurries of solid carbonaceous fuels in a liquid carrier with a free-oxygen containing gas and in the presence of a temperature moderator.

The gas generator is a vertical cylindrical steel pressure vessel lined on the inside with a thermal refractory material. A typical partial oxidation synthesis gas generator is shown in co-assigned U.S. Pat. No. 2,818,326 and U.S. Pat. No. 3,544,291 which are incorporated herein by reference. A burner is located in the top of the gas generator along the central vertical axis for introducing the feed streams. A suitable annulus-type burner is shown in co-assigned U.S. Pat. No. 2,928,460.

The term liquid hydrocarbonaceous fuel as used herein, is intended to include various materials, such as petroleum distillates and residues, gasoline, naphtha, kerosene, crude petroleum asphalt, gas oil, residual oil, tar-sand and shale oil, oil derived from coal, aromatic hydrocarbons (such as benzene, toluene, and xylene fractions), coal tar, cycle gas oil from fluid-catalytic-cracking operation, furfural extract of coker gas oil, and mixtures thereof. Included within the definition of liquid hydrocarbonaceous fuel are oxygenated hydrocarbonaceous organic materials including carbohydrates, cellulosic materials, aldehydes, organic acids, alcohols, ketones, oxygenated fuel oil, waste liquid and by-products from chemical processes containing oxygenated hydrocarbonaceous organic materials, and mixtures thereof.

Also included within the definition of liquid hydrocarbonaceous fuel are pumpable slurries of solid carbonaceous fuels. Pumpable slurries of solid carbonaceous fuels may have a solids content in the range of about 25-70 wt. % such as 45-68 wt. %, depending on the characteristics of the fuel and the slurrying medium. The slurrying medium may be water, liquid hydrocarbonaceous fuel, or both.

The term solid carbonaceous fuel includes coal, such a anthracite, bituminous, subbituminous; coke from coal; lignite; residue derived from coal liquefaction; oil shale; tar sands; petroleum coke; asphalt; pitch; particulate carbon (soot); concentrated sewer sludge; and mixtures thereof. The solid carbonaceous fuel may be ground to a particle size so that 100% passes through an ASTM E11-70 Sieve Designation Standard (SDS) 1.4 mm Alternative No. 14.

The use of a temperature moderator to moderate the temperature in the reaction zone of the gas generator depends in general on the carbon to hydrogen ratio of the feed stock and the oxygen content of the oxidant stream. Suitable temperature moderators include steam, water, $CO_2$-rich gas, liquid $CO_2$, cooled effluent gas from the gas generator, by-product nitrogen from the air separation unit used to produce substantially pure oxygen, and mixtures of the aforesaid temperature moderators. The temperature moderator may be introduced into the gas generator in admixture with either the liquid hydrocarbonaceous fuel feed, the free-oxygen containing stream, or both. Alternatively, the temperature moderator may be introduced into the reaction zone of the gas generator by way of a separate conduit in the fuel burner. When $H_2O$ is introduced into the gas generator either as a temperature moderator, a slurrying medium, or both, the weight ratio of water to the hydrocarbonaceous fuel is in the range of about 0.3 to 2.0 and preferably in the range of about 0.5 to 1.0.

The term free-oxygen containing gas, as used herein is intended to include air, oxygen-enriched air, i.e., greater than 21 mole % oxygen, and substantially pure oxygen, i.e., greater than 95 mole % oxygen, (the remainder comprising $N_2$ and rare gases). Free-oxygen containing gas may be introduced into the burner at a temperature in the range of about ambient to 1200° F. The atomic ratio of free-oxygen in the oxidant to carbon in the feed stock (O/C, atom/atom) is preferably in the range of about 0.7 to 1.5, such as about 0.80 to 1.2.

The relative proportions of solid carbonaceous fuel, liquid hydrocarbon fuel if any, water or other temperature moderator, and oxygen in the feed streams to the gas generator are carefully regulated to convert a substantial portion of the carbon in the fuel feed to the partial oxidation gas generator e.g. 75 to 95 wt. %, such as 80 to 90 wt. % of the carbon to carbon oxides e.g., CO and $CO_2$ and to maintain an autogenous reaction zone temperature in the range of about 1700° to 3000° F., such as about 2350° to 2900° F. Advantageously, with ash-containing solid carbonaceous slurry feeds, the ash in the solid carbonaceous fuel forms molten slag at such later reaction temperatures. Molten slag is much easier to separate from the hot effluent gas then fly-ash. The pressure in the reaction zone is in the range of about 1 to 250 atmospheres, such as about 10 to 200 atmospheres. The time in the reaction zone of the partial oxidation gas generator in seconds is in the range of about 0.5 to 20, such as normally about 1.0 to 5.

The effluent gas stream leaving the partial oxidation gas generator has the following composition in mole % depending on the amount and composition of the feedstreams: $H_2$ 8.0 to 60.0, CO 8.0 to 70.0, $CO_2$ 1.0 to 50.0, $H_2O$ 2.0 to 50.0, $CH_4$ 0.0 to 2.0, $H_2S$ 0.0 to 2.0, COS 0.0 to 1.0, $N_2$ 0.0 to 80.0, and Ar 0.0 to 2.0. Trace amounts of the following gaseous impurities may also be present in the gas stream in parts per million (ppm): HCN 0.5 to about 100, such as about 2 to 20, HCl 0 to about 20,000, such as about 200 to 2,000 and $NH_3$ 0 to about 10,000, such as about 100 to 1,000. Entrained in the effluent gas stream is about 0.5 to 20 wt. %, such as 1 to 4 wt. % of particulate carbon (basis weight of carbon in the feed to the gas generator) and the remaining portion of the unconverted ash-containing solid carbonaceous fuel feed. Molten slag resulting from the fusion of the ash content of the coal may be also entrained in the gas stream leaving the generator.

The effluent gas stream leaving the reaction zone of the noncatalytic partial oxidation gas generator at a temperature in the range of about 1700° F. to 3000° F. may be either (1) quench cooled and scrubbed with water, (2) cooled in a gas cooler and then scrubbed with water, or both (1) and (2). When the gas generator is operated at elevated pressure i.e. above about 10 atmospheres small amounts of formic acid may be produced in the system and dissolves in the water in the quench cooling and scrubbing zones. Clarifying the quench cooling and/or scrubbing water by removing dispersed solids such as soot and ash have been previously disclosed. For example, in coassigned U.S. Pat. No. 4,014,786, which is incorporated herein by reference, a liquid organic extractant is employed in a decanter system to remove soot from carbon-water dispersion produced during gas quench cooling and/or scrubbing. In coassigned U.S. Pat. No. 3,544,291 a settler is used to separate a stream of clarified water from two water streams of carbon and ash.

Even though soot and other solids have been removed from the quench and/or scrubbing water in the manner previously described, there remains in the water a mixture comprising small amounts of cyanides, metal halides, formates and possibly other by-products of the partial oxidation reaction such as ammonia and the metals nickel, vanadium, iron, and the oxides and/or sulfides thereof. These constituents may build up in the system when the water streams are recycled and may corrode or deposit out in downstream equipment. By the subject process, these contaminants may be concentrated as a toxic inorganic CN-containing sludge and be safely disposed of in the partial oxidation gas generator in admixture with the liquid hydrocarbonaceous fuel.

On a weight basis in parts per million (ppm) the quench and/or scrubbing water from the partial oxidation process may contain the following impurities: total cyanide (free and combined) from 5 to 1,000 or more, such as 10 to 100; halides of ammonium or a metal selected from the group sodium, calcium, iron, nickel, and mixtures thereof about 25 to 20,000, such as about 50 to 5,000; formates about 100 to 20,000, such as about 500 to 10,000; a metal constituent selected from the group nickel, vanadium, iron and mixtures thereof about 5 to 1,000 each, such as about 10 to 250 each; sulfides and thiocyanates about 5 to 1,000 each, such as about 10 to 250 each; ammonia about 0 to 10,000, such as about 100 to 5,000.

The inorganic CN-containing sludge is precipitated in at least a portion i.e., about 10 to 100 wt. %, such as about 20 to 50 wt. % of the quench and/or scrubbing water after at least a portion of the entrained solids are removed in the following manner.

(1) Ferrous sulfate or ferrous chloride is mixed with the water at a temperature in the range of about 60° to 210° F., such as 125° to 200° F. and a pH in the range of about 7.0 to 9.0. By definition $pH = -\log[H_3O^+]$. The moles of ferrous ions added are in the range of about 1.2 to 10, such as 2 to 6, times the moles of total cyanides in the water. (2) At substantially the same temperature and preferably in the range of about 125° to 200° F., sodium hydroxide or calcium hydroxide is added with constant mixing to raise the pH of the water treated in (1) to a value in the range of 9–11. To avoid the formation in the system of calcium sulfate (scale), which deposits out at elevated temperatures such as in the ammonia stripper, the preferable improved combinations of ferrous salts and bases are (a) ferrous sulfate and sodium hydroxide, and (b) ferrous chloride and calcium hydroxide.

With the addition of the base, an inorganic CN-containing sludge forms or precipitates substantially comprising ash and a mixture of the cyanides, hydroxides and sulfides of iron. Ash may comprise the metals and the sulfides of the metals selected from the group nickel, vanadium, iron, and mixtures thereof. In addition, when the base is calcium hydroxide as in the (b) combination above, then calcium carbonate will also be present in said CN-containing sludge. Further, should the combination of ferrous sulfate and calcium hydroxide be used in a specific case then in addition the carbonate and sulfate of calcium will also be present in said CN-containing sludge.

Optionally, to increase the settling rate of the inorganic CN-containing sludge that takes place next in a conventional settler, colloidal clay or other conventional weighting agent followed by about 0.05 wt. % of a conventional flocculant/coagulant such as a polyelectrolyte polymer may be mixed in with the sludge forming mixture.

Settling of the suspension of CN-containing sludge in water takes place in a conventional settler or clarifier. The underflow toxic sludge stream may be then introduced into a mixing tank where it is mixed at least one other liquid hydrocarbonaceous fuel feed stream and safely disposed of in the partial oxidation gas generator.

The ash components in the CN-containing sludge would then be recovered as slag from the gas generator. Another benefit may arise when coal is included in the feed and the CN-containing sludge contains calcium compounds which serve to catalyze the endothermic coal-steam reaction during gasification. Further, the calcium compounds will act as fluxing agents for ash in the generator charge, thereby lowering the coal ash fusion temperature. By this means the synthesis gas generator may be operated at a lower temperature while still producing molten slag. The oxygen consumption is thereby reduced at a significant economic savings.

(3) Most of the ammonia in the substantially solid-free overflow from the settler may be removed by steam stripping. Optionally, this ammonia may be used to supplement the base in adjusting the pH of the quench and/or scrubbing water in (1) and/or the ferrous ion treated water in (2), above.

(4) To remove formates and other any other organic matter that may be present in the stripped water from (3), the pH of the water is adjusted to a value in the range of about 6 to 8 by conventional means. The water is then introduced into a conventional biological reactor where the organic matter, including formates, are converted into $CO_2$ and a biological residue that may be safely disposed of without polluting the environment. Alternatively, the biological residue may be recycled to the partial oxidation gas generator in admixture with the other fuel streams and the inorganic CN-containing sludge stream.

The upgraded water from the biological reactor may be recycled to the gas quench and/or scrubbing zone or safely disposed of without polluting the environment. The composition of the ungraded water having a pH of about 7.5 is less than the following in parts per million: CN total 3.0, CN free 1.0, SCN 1.0, sulfide 1.0, formate 50, $NH_3$ 20, nickel-vanadium-iron 1, total suspended solids 40, and BOD's, unfiltered 40.

DESCRIPTION OF THE DRAWING

A more complete understanding of the invention may be had by reference to the accompanying drawing which illustrates a preferred embodiment of the invention.

Although the drawing illustrates a preferred embodiment of the invention, it is not intended to limit the subject invention to the particular apparatus or materials described.

Gas generator 1 is a vertical cylindrically shaped unpacked free-flow non-catalytic steel pressure vessel lined with refractory 2. Annulus-type burner 3 is mounted in upper inlet 4 for introducing the reactant feedstreams into reaction zone 5.

Burner 3 includes central passage 10, through which a stream of free-oxygen containing gas from line 11 is introduced, and annular passage 12 through which a mixture of hydrocarbonaceous fuel and a stream of temperature moderator, such as steam from line 13 is introduced. Fresh liquid hydrocarbonaceous fuel feed in line 14 is passed through lines 15–16 and into mixing tank 17. In tank 17, the fresh liquid hydrocarbonaceous fuel is mixed with a recycled liquid hydrocarbonaceous soot slurry stream from line 18 and an inorganic CN-containing sludge which is pumped into tank 17 by pump 19 from the bottom of settler or clarifier 20 through lines 21–23. This fuel feed mixture is passed through lines 24–25 and mixed in line 13 with a temperature moderator from line 26, valve 27, and line 28 and/or steam from gas cooler 29 by way of lines 30–31, valve 32, and lines 33 and 25. By-product steam may be passed through line 34, valve 36, and line 35 for use elsewhere in the system or for export. Fresh boiler feed water (BFW) enters gas cooler 29 through line 40.

The raw effluent gas stream from reaction zone 5 splits into two gas streams in chamber 41. The two gas streams in passages 42 and 43 are simultaneously and separately cooled, cleaned, and scrubbed with water to remove entrained soot. Thus, the hot gas stream in passage 42 is passed through dip-tube 44 and quenched in water 45 contained in the bottom of quench tank 46. A recycle stream of water is introduced into quench tank 46 via line 47.

The quenched gas leaves through line 48 and is scrubbed again in nozzle srubber 49 before passing through dip-tube 50 into water 51 contained in the bottom of gas scrubber 52. The gas stream then passes up through shower 53 where it is contacted with water before leaving through line 54 at the top of gas scrubber 52 as a clean stream of product synthesis gas saturated with water. Nozzle scrubber 49 and gas scrubber 53 may be fed with fresh or upgraded recycle water from lines 55 and 56 respectively.

When the principal feed to the gas generator comprises an ash-containing solid carbonaceous fuel such as coal, then unconverted carbon, ash, and any molten slag formed in the reaction zone drops through the dip-tube 44 into the pool of water 45 in quench tank 46. Any molten slag is quickly cooled to form granular solid particles. Water is supplied to quench chamber 46 through line 47. Accumulations of solid material, such as solidified slag or ash, unconverted carbon and bits of refractory are withdrawn as required from quench tank 46 through line 60, valve 61, 62 and a conventional lock hopper system (not shown). A suitable lock hopper arrangement is shown and described in coassigned U.S. Pat. No. 3,544,291, which is incorporated herein by reference. The solid residue and water are discharged from the lock hopper into a conventional solids-liquid separation means such as a settler, filter or centrifuge (not shown).

In the embodiment of the process in which the liquid hydrocarbonaceous fuel comprises a liquid hydrocarbon such as petroleum oil or a slurry of solid carbonaceous fuel in a liquid hydrocarbonaceous fuel, additional unreacted carbon i.e. soot is formed in the gasifier and is removed when the gas stream is quenched in water 45. In such case, a stream of soot-water dispersion from the bottom of quench tank 46 is pumped through line 70 and mixed in line 71 with a stream of soot-water dispersion from line 72. The later stream of soot-water is obtained by scrubbing the second split stream of hot raw synthesis gas from line 43 with water after the gas stream is cooled by indirect heat exchange with BFW in gas cooler 29. Thus, the cooled stream of raw synthesis gas in line 73 is quenched and scrubbed with water 74 in conventional gas scrubber 75 and leaves through line 76 at the top. The gas stream is cooled below the dew point in gas cooler 77. Separation of water 78 takes place in separating tank 79, and a clean dewatered stream of product synthesis gas leaves through over head line 80.

Scrubbing water for gas scrubbers 52 and 75, may be provided through lines 81 to 83 and 81 and 84 to 86 respectively. The scrubbing water may comprise upgraded water from line 81; fresh make-up water from line 87, valve 88, and line 89; and mixtures thereof.

The soot-water dispersion in line 71 and a recycle portion of liquid organic extractant, such as naphtha, from lines 95, valve 96 and line 97 are mixed together in line 98. The mixture of soot-water and naphtha passes into decanter 104 by way of inlet 105, an annular passage in conduit sub-assembly 106, and lower horizontal radial nozzle 107. The mixture is discharged below interface level 108. Simultaneously, the second stage naphtha is introduced adjacent to or below the interface level 108 by way of line 109, valve 110, line 111, inlet 112, central conduit 113, and upper horizontal radial nozzle 114. During the two-stage mixing, soot separates from the water and forms a suspension with the liquid organic extractant. In the decanter, a dispersion of particulate carbon-soot and naphtha 115 forms in the upper portion of the decanter and floats on water 116.

The water is passed through lines 120 and 121, pressure reducing valve 122, line 123, and flashed into flash column 124. A stream of sulfur containing gaseous impurities leave through line 125 and is sent to a Claus unit for sulfur recovery. With valves 64 and 161 open and valve 65 closed, at least a portion i.e. about 10 to 100 wt. %, such as about 20 to 50 wt. % of the water in line 129 is treated in a water treatment facility, to be further described. The remaining portion, if any, of the water from line 129 may be passed through line 160, valve 161, and line 162 and then through the lines leading into quench tank 46 and/or gas scrubbers 52 and 75. Thus, by means of valves 161 and 64, the degassed water in 129 may be split between lines 160 and 132.

The soot-naphtha dispersion 115 in the upper section of decanter 104 is passed through line 155 and mixed in line 156 with fresh liquid hydrocarbonaceous fuel from lines 14 and 154. Intimate mixing is achieved with mixing valve 167, and the mixture is passed through line 168 into naphtha still 169 equipped with reboiler 170.

Naphtha is vaporized in still 169 and leaves through overhead line 171 along with a small amount of H$_2$O. This stream is cooled below the dew point in cooler 172. The liquid naphtha and water mixture is passed through line 173 and into separation vessel 174. Gaseous impurities are removed through overhead line 175 and sent to a Claus unit. Water 180 is removed from the bottom of vessel 174 by way of line 176, pump 177, and sent to flash column 124 by way of lines 181, 121 and 123. Naphtha 182 is removed from separation vessel 174 and recycled to decanter 104 by way of lines 183, 184 and line 185. A portion of the naphtha may be passed through line 186 and into still 169 as reflux. Make-up naphtha may be introduced into the system through line 187, valve 188, and line 189.

All of the liquid hydrocarbonaceous fuel-soot slurry from the bottom of the naphtha still may be recycled to gas generator 1 as a portion of the reactant fuel feed. Thus, the bottom slurry from the naphtha still may be passed through lines 18 and 16 into mixing tank 17 where it is mixed with fresh liquid hydrocarbonaceous feed from lines 14–16, and CN-containing sludge from lines 21 to 23.

In order to produce a stream of upgraded water for recycle to quench tank 46 and/or scrubbing units 52 and 75, at least a portion of the stream of flashed grey water in line 129, or the water stream in line 67 from a settler (not shown) or both are passed into mixing tank 63. For example, both streams 132 and 67 may be processed together in tank 63 when principal reactant fuel to the gasifier comprises a slurry of solid carbonaceous fuel, i.e. coal dispersed in a petroleum residuum. Also, with low soot-producing feed stocks such as coal-water slurries, valves 64 and 161 may be closed and valve 65 opened since in that embodiment the decanting zone may not be required. In such case, at least a portion of the other solids, i.e. about 10 to 100 wt. %, such as about 50 to 90 wt. %, are removed by conventional means from the water stream from line 62, and the water is then passed through lines 66, 67 and into the water upgrading facility.

The pH of the water in tank 63 is adjusted to a value in the range of 7 to 9. Ferrous sulfate or ferrous chloride is passed through line 68 to react with all of the cyanides and sulfides present in tank 63 and to convert them to iron cyanides and iron sulfides, respectively. The treated waste water is then passed through line 133 into mixing tank 134 where it is treated with a base from line 136 to adjust the pH to a value in the range of about 9.0 to 11.0. A sludge containing ferrous cyanide and other compounds precipitates. Optionally, a weighting agent and a polymeric flocculating agent to enhance the settling rate may then be added through line 135. The mixture is then passed through line 137 into a conventional clarifier or settler 20. After settling, inorganic CN-containing sludge is removed by way of line 21 and is pumped into mixing tank 17 as previously mentioned. The clarified water from settler 20 is passed through line 138 into ammonia stripper 139 where it is stripped of ammonia by steam from line 140. The $NH_3$ and steam leave through overhead line 141; and, the stripped water is passed through line 142 into a conventional biological reactor 143. Optionally, the $NH_3$ in line 141 may be introduced into tanks 63 and/or 134 as a portion of the base required for pH adjustment. The pH of the stripped water is adjusted to a value in the range of about 6–8. Organic matter, such as formates, are converted in reactor 143 into $CO_2$ which leaves through line 144, and a biological residue. Upgraded water leaves biological reactor 143 through lines 145 and 81 and is recycled to quench tank 45 and to gas scrubbers 52 and 75 in the manner described previously. A portion of the upgraded water, now being environmentally safe, may be optionally discharged from the system through line 146, valve 147, and line 148. Optionally, the biological residue may be passed through line 149, valve 150, and lines 151 and 23 for reaction in partial oxidation gas generator 1 after being mixed with the other reactant fuel feedstreams in mixing tank 17.

EXAMPLE

The following example illustrates an embodiment of the process of this invention, and it should not be construed as limiting the scope of the invention.

A slurry comprising 3724 tons per day of Kentucky bituminous coal having the following Ultimate Analysis in wt. % is reacted by partial oxidation to produce a raw effluent gas stream: C 72.18, H 4.96, N 1.65, S 3.45, Ash 9.68 and O 8.08.

About 0.2–0.3 wt. % of the ash or about 1.08 tons per day appears as soluble material in the gas quench cooling and srubbing system. To control the total dissolved solids at 2500 parts per million (ppm), a blow down stream of 72 gallons per minute of water is taken having the following analysis in parts per million: S 20, CN 30, SCN 10, $NH_3$ 1500, formate 300, ash 200, and total inorganic C 30.

After removal of at least a portion of the entrained solids, the pH of the water is adjusted to about 8. At a temperature of 180° F., 0.0106 lbs. of $FeSO_4.7H_2O$ per gallon of water are mixed with the water. The pH is then adjusted to about 10 by the addition of about 0.06 lbs. of NaOH per gallon of water. About 1190 pounds per day (dry basis) of an inorganic CN-containing sludge precipitates out substantially having the following composition in weight percent dry basis: ash 35.4, FeS 9.8, $Fe(CN)_2$ 5.6, and $Fe(OH)_2$ 49.2. Optionally, to enhance the settling rate of the sludge in a settler, a conventional weighting agent such as colloidal clay may be mixed in followed by about 0.05 wt. % of a conventional flocculant coagulant, such as a polyelectrolyte polymer.

The inorganic CN-containing sludge is then mixed with the coal slurry feed to the partial oxidation gas generator as a portion of the feed.

The overflow water stream from the settler is stripped of $NH_3$ in an ammonia stripper, and the formates and other organic matter are reacted in a conventional biological reactor after a pH adjustment to about 7. A biological residue and upgraded water are produced which are suitable for disposal without effecting the environment. The free CN and S contents in the upgraded water are less than 1 ppm, formates are less than 50 ppm and ammonia is less than 20 ppm. This upgraded water stream may be recycled to the quench cooling and/or scrubbing zone. Further, by the subject process, the toxic sludge having a CN content of over 27,000 parts per million is safely disposed of in the gas generator without effecting the environment. In one embodiment, the biological residue is also recycled to the gas generator as a portion of the feed.

The process of the invention has been described generally and by examples with reference to a hydrocarbonaceous fuel and gas streams of particular compositions for purposes of clarity and illustration only. It will be apparent to those skilled in the art from the foregoing that various modification of the process and materials disclosed herein can be made without departure from the spirit of the invention.

I claim:

1. A pollution abatement process for a toxic inorganic CN-containing sludge comprising (1) mixing together the toxic CN-containing sludge from (6) and a liquid hydrocarbonaceous fuel to produce a fuel mixture;

(2) reacting the fuel mixture from (1) by partial oxidation with a free-oxygen containing gas and a temperature moderator in the reaction zone of a free-flow partial oxidation gas generator at an autogenous temperature in the range of about 1700° to 3000° F. and a pressure in the range of about 10 to 200 atmospheres to produce an effluent gas stream substantially comprising $H_2$, CO, $CO_2$, at least one gas from the group consisting of $H_2O$, $CH_4$, $H_2S$, COS, $N_2$, and Ar, and containing particulate carbon, ash and trace amounts of HCN, HCL and $NH_3$;

(3) introducing the effluent gas stream from (2) into a gas quench cooling and/or scrubbing zone, and producing a carbon-water dispersion containing dissolved formic acid and a separate stream of raw synthesis gas, reducing gas or fuel gas;

(4) resolving said carbon-water dispersion in a decanting zone to produce a carbon-liquid hydrocarbonaceous fuel slurry and water containing free and combined cyanides; halides of ammonium or a metal selected from the group sodium, calcium, iron, nickel, and mixtures thereof; formates; sulfides, thiocyanates; ammonia; and metal constituents selected from the group consisting of nickel, vanadium, iron, and mixtures thereof;

(5) mixing at least a portion of the water from (4) at a temperature in the range of about 125° to 200° F., and a pH in the range of about 7 to 9 with a ferrous salt thereby converting a substantial portion of said cyanides to iron cyanides, adding a base to increase the pH to a value in the range of about 9–11, and precipitating said toxic inorganic CN-containing sludge in said water; and (6) separating the suspended CN-containing sludge from the water in a separating zone.

2. The process of claim 1 provided with the additional steps of (a) steam stripping $NH_3$ from the water separated in (6);

(b) adjusting the pH of the water from (a) to a value in the range of 6–8 and reacting in a biological reactor the formates and any other organic matter that may be present in the water, thereby producing $CO_2$, upgraded water, and biological residue; and (c) recycling at least a portion of the upgraded water to the quench cooling and/or scrubbing zone, and mixing at least a portion of the biological residue with the fuel mixture in (1).

3. The process of claim 1 wherein said ferrous salt and base are either (a) ferrous sulfate and sodium hydroxide, or (b) ferrous chloride and calcium hydroxide.

4. The process of claim 1 provided with the additional step of mixing the suspension of toxic CN-containing sludge and water with a weighting agent and a flocculant/coagulant to enhance the separating rate for said sludge.

5. The process of claim 1 wherein said liquid hydrocarbonaceous fuel includes a slurry of coal; the base in (5) is calcium hydroxide; the CN-containing sludge includes the calcium compounds selected from the group consisting of hydroxides, carbonates, sulfates, and mixtures thereof; and coal-ash produced in the reaction zone of the gas generator reacts with calcium to produce ash having a lower ash-fusion temperature.

6. The process of claim 2 where in (5) both adjustments of the pH are made with a base which is supplemented by ammonia from (a).

7. The process of claim 4 wherein said weighting agent is colloidal clay and said flocculant/coagulant is a polyelectrolyte polymer.

8. The process of claim 1 in which said liquid hydrocarbonaceous fuel is selected from the group consisting of petroleum distillates and residua, gasoline, naphtha, kerosine crude petroleum, asphalt, gas oil, residual oil, tar-sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof.

9. The process of claim 1 in which said liquid hydrocarbonaceous fuel is a pumpable slurry of a solid carbonaceous fuel in a liquid carrier from the group consisting of water, liquid hydrocarbon fuel, and mixtures thereof.

10. The process of claim 1 in which said liquid hydrocarbonaceous fuel is an oxygenated hydrocarbonaceous organic material from the group consisting of carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

11. The process of claim 1 in which said temperature moderator is selected from the group consisting of steam, water, $CO_2$-rich gas, liquid $CO_2$, $N_2$, cooled effluent gas from the gas generator, and mixtures thereof.

12. The process of claim 1 in which said free-oxygen containing gas is selected from the group consisting of air, oxygen-enriched-air i.e. greater than 21 mole % $O_2$, and substantially pure oxygen, i.e. greater than about 95 mole % oxygen.

13. The process of claim 9 wherein said solid carbonaceous fuel is selected from the group consisting of coal, coke from coal, residue derived from coal liquefaction, oil shale, tar sands, petroleum coke, asphalt, pitch, particulate carbon, concentrated sewer sludge, and mixtures thereof.

14. A process for disposing of a toxic inorganic CN-containing sludge produced by removing entrained particulate matter from the water used to quench cool and/or scrub the hot raw effluent gas stream produced in the reaction zone of a partial oxidation gas generator by the partial oxidation of a liquid hydrocarbonaceous fuel and mixing at least a portion of the water thereby produced with ferrous sulfate or ferrous chloride, adjusting the pH of said mixture to a value in the range of about 9–11 by the addition of sodium or calcium hydroxide, precipitating in said water an inorganic sludge in which iron cyanide is present, and separating said inorganic sludge from the water; which process consists essentially of mixing said inorganic CN-containing sludge with at least a portion of said liquid hydrocarbonaceous fuel feed to the reaction zone of the partial oxidation gas generator, and reacting said mixture with a free-oxygen containing gas in the reaction zone of the partial oxidation gas generator at a temperature in the range of about 1700° F. to 3000° F. and a pressure in the range of about 1–250 atmospheres thereby destroying said iron cyanides, and recovering the ash components of said sludge as a portion of the slag from the generator.

15. The process of claim 14 wherein said inorganic CN-containing sludge substantially comprises a mixture of the cyanides, hydroxides and sulfides of iron, ash, and optionally calcium carbonate with or without calcium sulfate.

16. The process of claim 14 wherein the water separated from said inorganic CN-containing sludge contains ammonia and formates and provided with the steps of stripping ammonia from said water; reacting said formates and other organic matter in a biological reaction zone to produce $CO_2$, organic sludge, and upgraded water; recycling said upgraded water to said gas quenching and/or scrubbing zone or discharging said upgraded water from the system; and introducing said organic sludge into the reaction zone of the gas generator as a portion of the reactant fuel feed or discharging said organic sludge from the system.

* * * * *